United States Patent

Nakano et al.

Patent Number: 5,487,116
Date of Patent: Jan. 23, 1996

[54] VEHICLE RECOGNITION APPARATUS

[75] Inventors: Nobuyuki Nakano, Hirakata; Nobuhiko Yasui, Moriguchi, both of Japan

[73] Assignee: Matsushita Electric Industrial Co., Ltd., Osaka, Japan

[21] Appl. No.: 246,634

[22] Filed: May 20, 1994

[30] Foreign Application Priority Data

May 25, 1993 [JP] Japan ................ 5-147025
Nov. 8, 1993 [JP] Japan ................ 5-277217

[51] Int. Cl.$^6$ ................................ G06K 9/00
[52] U.S. Cl. ............ 382/104; 364/424.02; 364/460; 382/154; 382/199
[58] Field of Search ............... 382/1, 22, 18, 382/42, 104, 106, 154, 171, 199; 364/424.02, 460, 461; 348/42, 118, 119

[56] References Cited

U.S. PATENT DOCUMENTS 4,601,053  7/1986  Grumet ........................... 382/1
4,931,937  6/1990  Kakinami et al. ............. 382/22

Primary Examiner—Leo H. Boudreau
Assistant Examiner—Phuoc Tran
Attorney, Agent, or Firm—Ratner & Prestia

[57] ABSTRACT

An apparatus for recognizing contours of a preceding vehicle from road images input by the use of vehicle-mounted cameras is described. The cameras view an object in front of the vehicle having the apparatus thereon and measure a distance to the recognized preceding vehicle. The apparatus includes image input video cameras, A/D converters, image memories, an image processing MPU, a display, an output interface, and a display controller.

5 Claims, 18 Drawing Sheets

FIG. 1-A
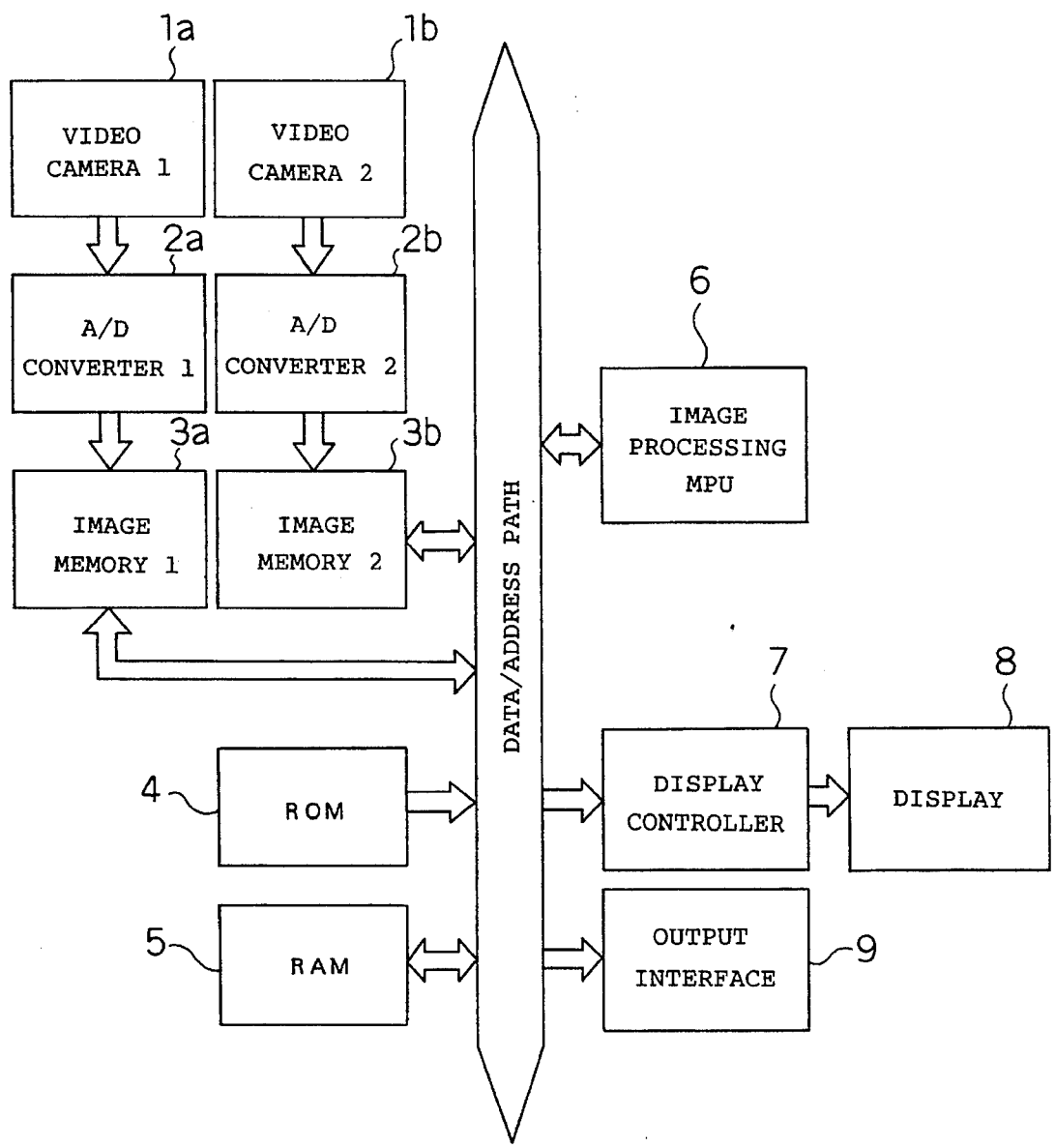

FIG. 1-B
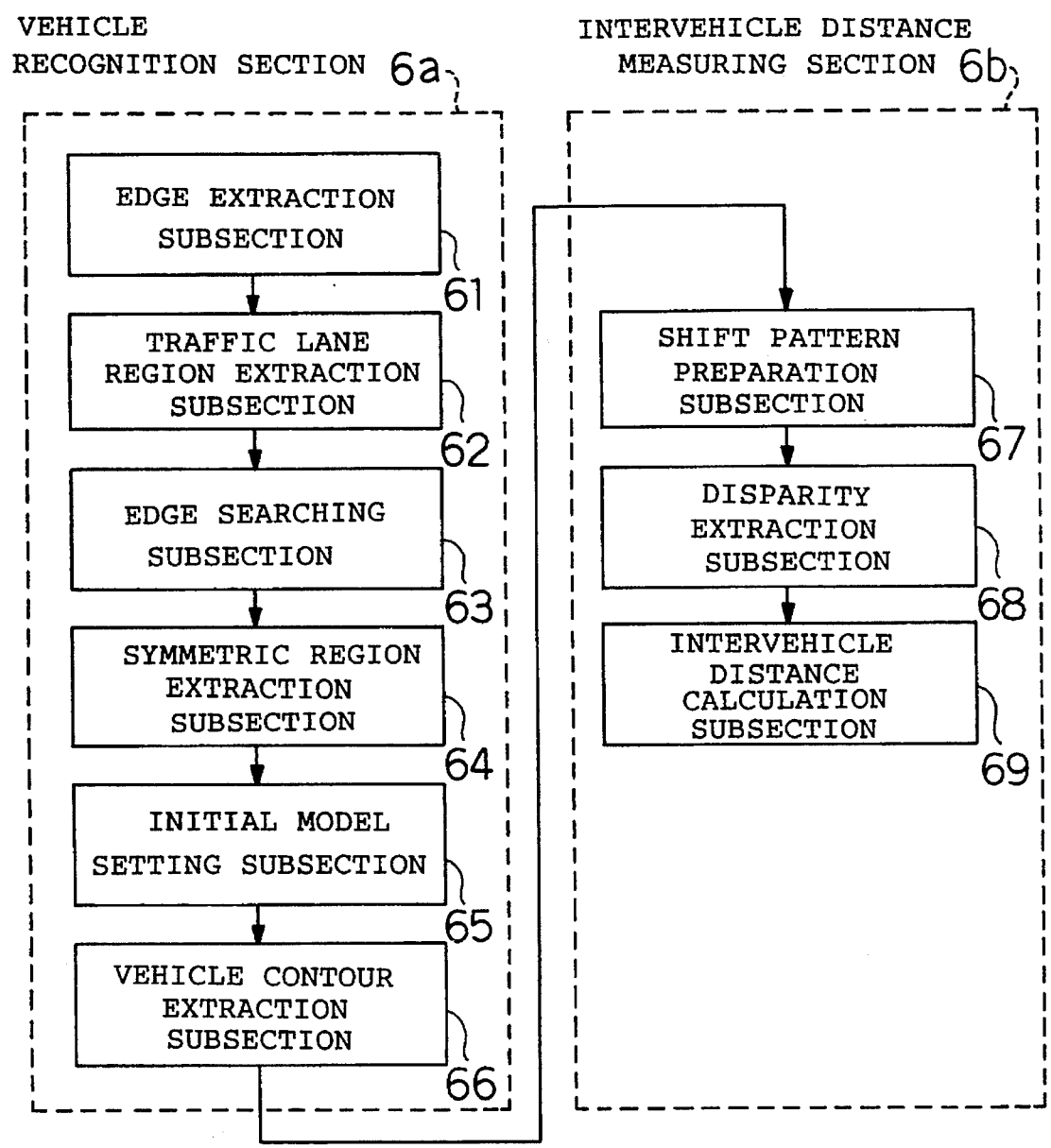

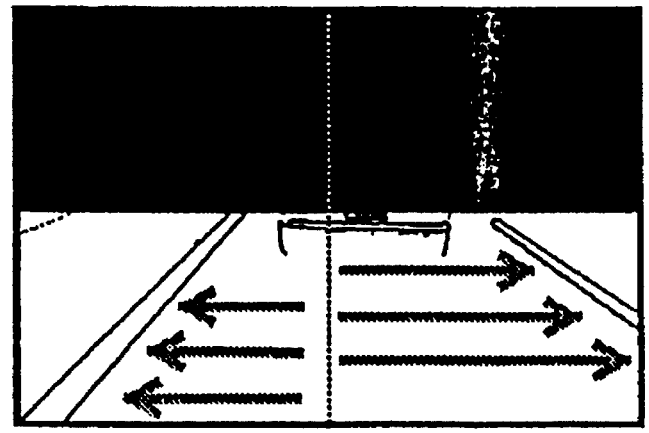
LEFT WHITE LINE    CENTER    RIGHT WHITE LINE
  SEARCHING       LINE         SEARCHING
F I G. 8
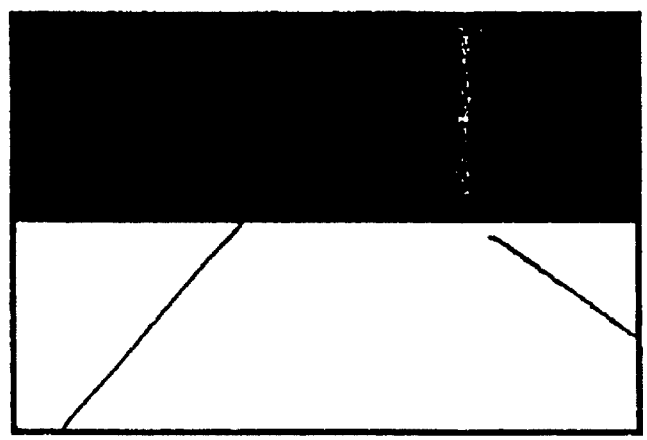
F I G. 9

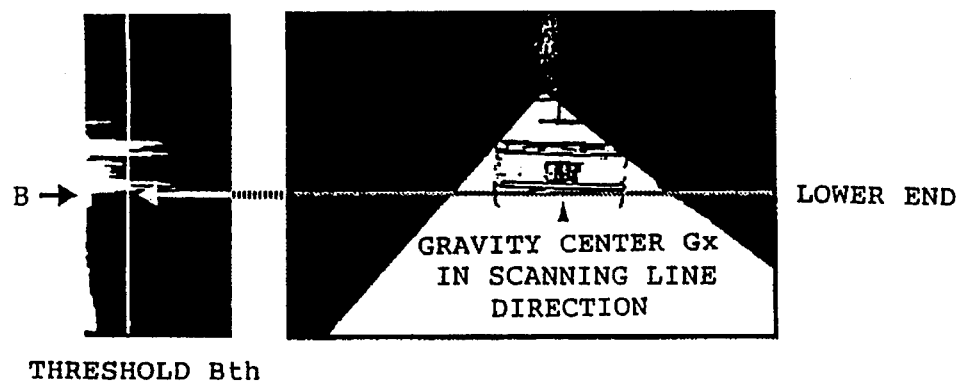
THRESHOLD Bth
FIG. 12a   FIG. 12b
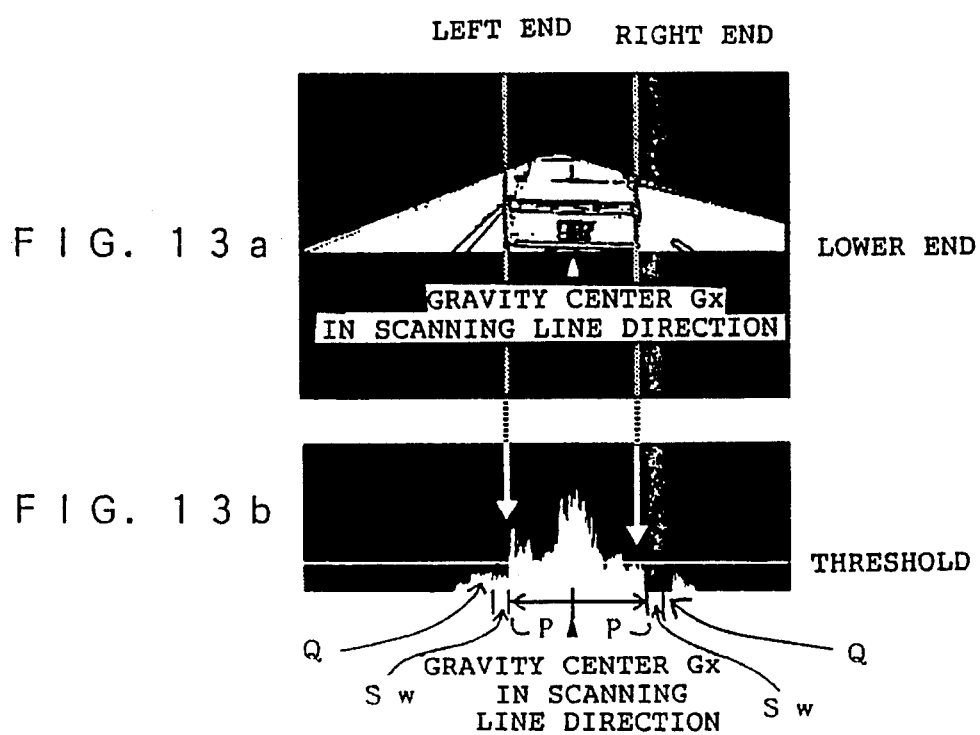
FIG. 13a
FIG. 13b
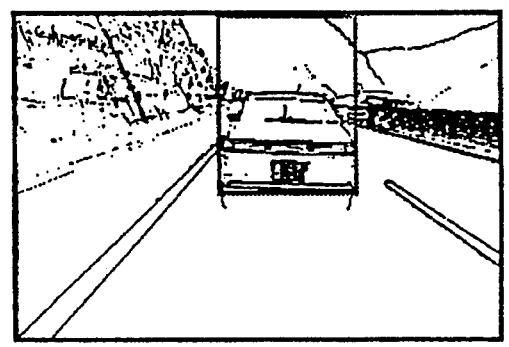
FIG. 14

F I G. 1 5
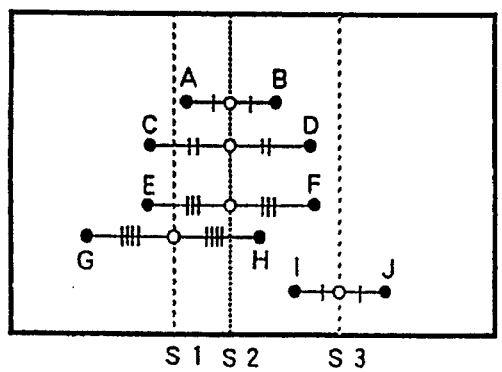
F I G. 1 6 a
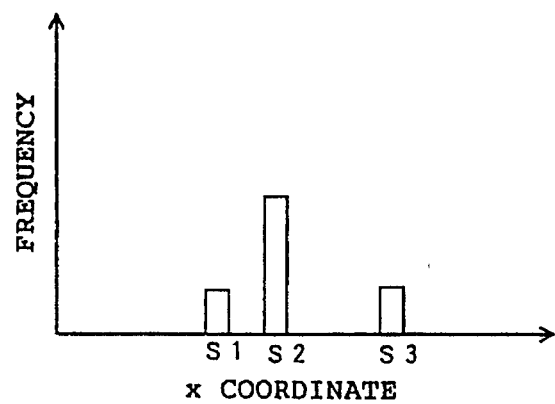
F I G. 1 6 b
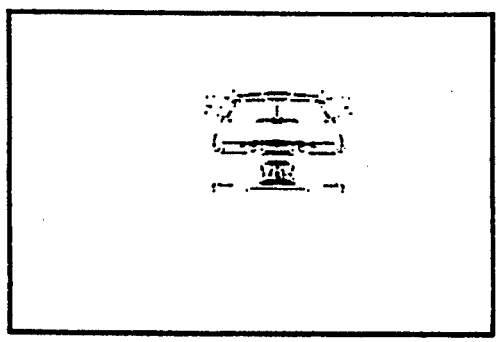
F I G. 1 7 a
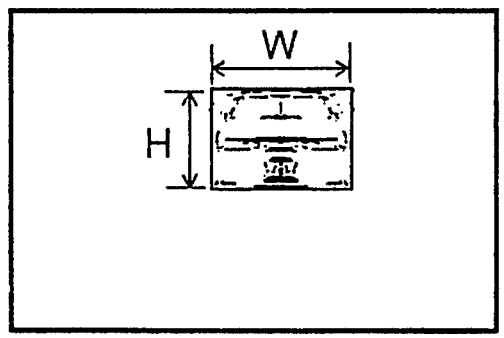
F I G. 1 7 b

← DISPARITY

VEHICLE RECOGNITION APPARATUS

BACKGROUND OF THE INVENTION

1. Field of the Invention

The present invention relates to an apparatus for recognizing a preceding vehicle by the use of image processing technology and measuring a distance to the recognized vehicle.

2. Description of the Prior Art

Heretofore, as described in Japanese Laid-Open Patent HEI 1-281600, some such apparatuses for recognizing a preceding vehicle have traced edges extracted from images to extract a preceding vehicle existing region.

However, such conventional vehicle recognition apparatuses have had a problem in that where vehicle edges extracted by an edge extraction process have a disconnection, the region cannot be exactly extracted. The distance measuring by stereo vision also has had a problem in that there is developed a difference between the vehicle shapes observed by the right-hand and left-hand cameras, so that a correlation between two images is hardly established.

SUMMARY OF THE INVENTION

A first object of the present invention is to provide an apparatus for recognizing a preceding vehicle from road images input by the use of video cameras and measuring a distance to the recognized preceding vehicle.

A second object of the present invention is to provide an apparatus for extracting regions in which the preceding vehicle seems to exist on the basis of the distribution of edges scattered in the images of the right/left symmetricalness of the preceding vehicle.

A third object of the present invention is to provide an apparatus for setting automatically an initial model of Active Contour Models.

A fourth object of the present invention is to provide an apparatus for extracting contours of the preceding vehicle by the use of the technique of the Active Contour Models.

A fifth object of the present invention is to provide an apparatus for measuring the distance to the preceding vehicle by the use of the contours of the preceding vehicle extracted from the images.

In order to achieve the above-mentioned objects, the present invention includes stereo cameras which are mounted on a vehicle to pick up road scenes in front of the vehicle, A/D converters for A/D converting analog image signals input from the cameras, image memories for storing road images digitalized by the A/D converters, a ROM, a RAM as a work region for accumulating data or programs, an image processing microprocessor for processing the road images stored in the image memories, a display for displaying the processing results, a display controller for controlling the display, and an output interface for implementing other application functions. The image processing microprocessor consists of a vehicle recognition section for recognizing the preceding vehicle from the input images and an intervehicle distance measuring section for measuring the distance to the recognized preceding vehicle. The vehicle recognition section comprises an edge extraction subsection for applying differential processing to the road images stored in the image memories to extract edges, a traffic lane region extraction subsection for extracting traffic lane regions from the road images stored in the image memories, an edge searching subsection for extracting vehicle candidate regions from the road images stored in the image memories, a symmetrical region extraction subsection for extracting right/left symmetrical regions from the vehicle candidate regions searched from the edge searching subsection to limit further the vehicle candidate regions, an initial model setting subsection for setting models for the symmetrical regions extracted by the symmetrical region extraction subsection, and a vehicle contour extraction subsection for extracting contours of the preceding vehicle on the basis of the symmetrical regions extracted by the symmetrical region extraction subsection and of the information on shapes of models set by the initial model setting means. The intervehicle distance measuring section comprises a shift pattern preparation subsection for preparing a pattern performing a shift operation with respect to a reference pattern, a disparity extraction subsection for shifting the shift pattern prepared by the shift pattern preparation subsection with respect to the reference pattern and establishing a correlation between both the patterns so as to extract a disparity, and an intervehicle distance calculation subsection for calculating the intervehicle distance on the basis of the disparity extracted by the disparity extraction subsection and of camera positional information.

BRIEF DESCRIPTION OF THE DRAWINGS

FIGS. 1-A and 1-B are block diagrams showing a basic composition of an embodiment of the present invention.

FIG. 8 is a typical view showing a processing for extracting white line contours.

FIG. 9 is a view showing the results obtained by extracting the white line contours.

FIGS. 12a and 12b are typical views showing a concept of a processing for extracting the lower ends of vehicle candidate regions in the edge searching processing.

FIGS. 13a and 13b are typical views showing a concept of a processing for extracting the right/left ends of vehicle candidate regions in the edge searching processing.

FIG. 14 is a view showing the results obtained by extracting the vehicle candidate regions by the edge searching processing.

FIG. 15 is a view showing a processing range in the symmetric region extraction processing.

FIGS. 16a and 16b are typical views showing a processing concept of the symmetric region extraction processing.

FIGS. 17a and 17b are views showing the results of the symmetric region extraction processing.

DESCRIPTION OF THE PREFERRED EMBODIMENTS

With reference to drawings, an embodiment of the present invention will be explained hereinafter.

Figure 2:
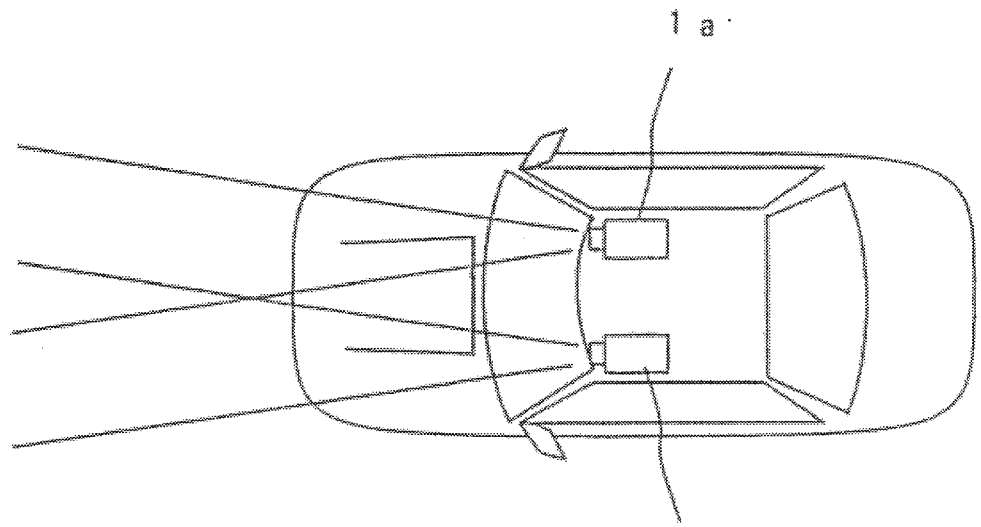
FIG. 2 is a view showing an example of installation of cameras on a vehicle.

FIGS. 1-A and 1-B are block diagrams showing a basic composition of an embodiment of the present invention. The numerals 1a and 1b indicate a pair of cameras for picking up an object in front of a vehicle. The cameras are installed on the front side of the vehicle in a manner not to obscure the field view of a driver, as shown in FIG. 2. The numerals 2a and 2b indicate A/D converters each for digitalizing analog image signals input from the video cameras 1a and 1a. The numerals 3a and 3b indicate image memories for storing road images digitalized by the A/D converters 2a and 2b. The numeral 4 indicates a ROM (Read Only Memory) for loading programs describing processing contents of the present invention; and the numeral 5 indicates a RAM (Random Access Memory) as a work memory for storing programs or data. The numeral 6 indicates an image processing MPU (Micro Processor Unit), whose processing contents are broadly classified into a vehicle recognition section 6a for extracting contours of a preceding vehicle, and an intervehicle distance measuring section 6b for measuring a distance to the preceding vehicle, as shown in FIG. 1-B. The vehicle recognition section 6a further comprises an edge extraction subsection 61 for extracting edges from the road images, a traffic lane region extraction subsection 62 for extracting traffic lane regions, an edge searching subsection 63 for extracting vehicle candidate regions, a symmetric region extraction subsection 64 for extracting right/left symmetric regions in the vehicle candidate regions extracted by the edge searching subsection, an initial model setting subsection 65 for setting an initial model of Active Contour Models, and a vehicle contour extraction subsection 66 for extracting vehicle contours by the use of the Active Contour Models technique. The intervehicle distance measuring section 6b comprises a shift pattern preparation subsection 67 for preparing a pattern performing a shift operation with respect to a reference pattern, a disparity extraction subsection 68 for determining a disparity between the reference pattern and the shift pattern, and an intervehicle distance calculation subsection 69 for calculating the distance to the preceding vehicle. The numeral 7 indicates a display controller for performing various settings on a display 8 for displaying the processing results. The numeral 9 indicates an output interface for implementing various application functions using intervehicle information calculated by this apparatus, such as an autocruise for cruising the vehicle with the distance to the preceding vehicle kept constant, or an intervehicle distance alarm device for warning the driver if the distance to the preceding vehicle becomes a certain value or less.

Figure 3:
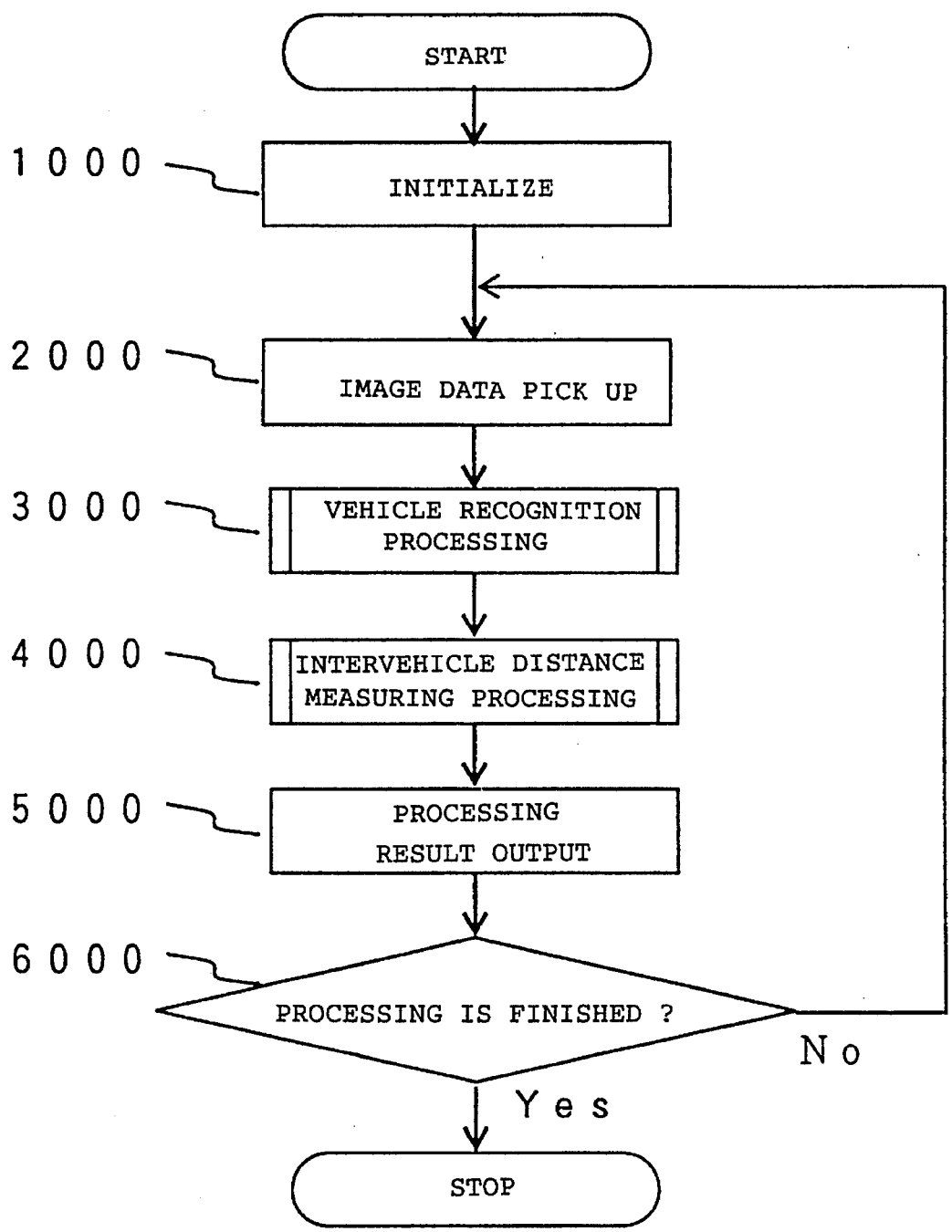
FIG. 3 is a flowchart showing an operation of the embodiment of the present invention.

FIG. 3 is a flowchart describing a processing procedure in the embodiment of the present invention. According to this flowchart, the processing contents will be explained hereinafter.

First, at step 1000, various initializations are performed to clear registers or counters so as to repeat the following processing.

Figure 4A:
FIGS. 4a and 4b are views showing examples of stereo images.
Figure 4B:
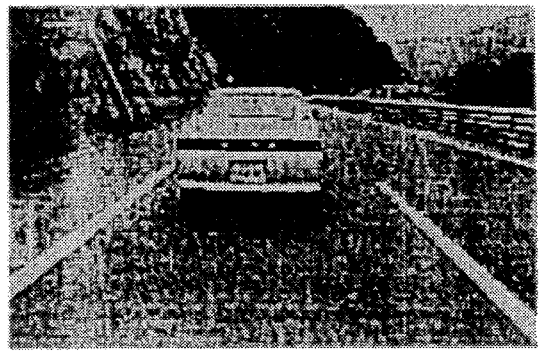

Then at step 2000, road images are picked up. First, the road images are input as analog image signals by the use of a pair of stereo cameras 1a and 1b. Then, these analog image signals are digitalized in 8-bit gradation value by the A/D converters 2a and 2b, and then stored in the image memories 3a and 3b. FIGS. 4a and 4b show an example of stereo road images thus picked up. The image shown in FIG. 4a is an input image from the video camera 1b, while that shown in FIG. 4b is an input image from the video camera 1a.

Then at step 3000 of FIG. 3, the preceding vehicle is recognized from the road images picked up at step 2000. In the preceding vehicle recognition processing step 3000, a pair of stereo images are subject to the same processing, respectively, so that only the processing for the input image from the video camera 1b will be described hereinafter.

Figure 5:
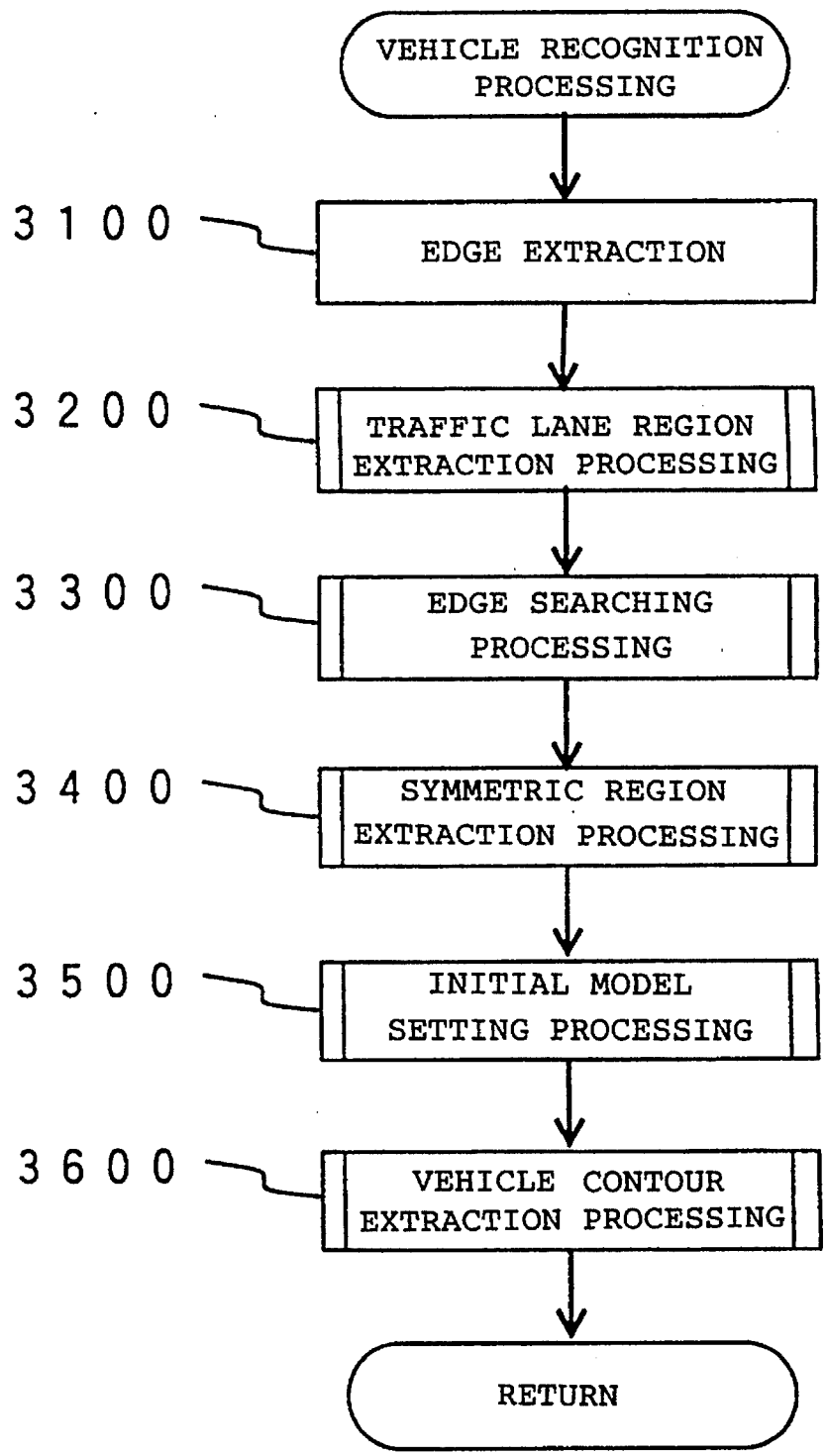
FIG. 5 is a flowchart showing an operation of the vehicle recognition processing.

FIG. 5 shows a flow diagram of a series of processing for the vehicle recognition processing step 3000 in FIG. 3.

Figure 6:
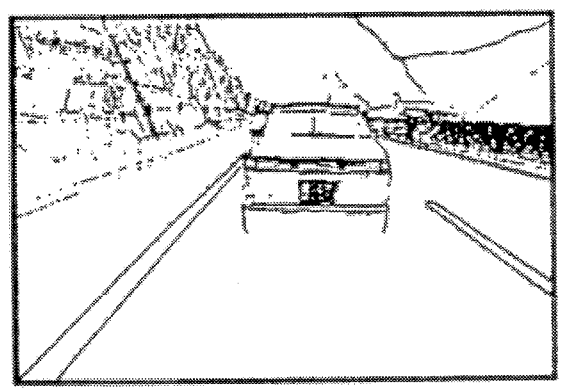
FIG. 6 is a view showing the results obtained by extracting edges from an inputted image.

First, at step 3100 of FIG. 5, a differential processing is applied to road images picked up at step 2000 of FIG. 3 to extract edges. A 3×3 sobel filter is used to extract edges, and differential intensities obtained for each pixel are stored in the image memories 3a and 3b. FIG. 6 shows the results obtained by making two values the differential intensity E (x, y) by the use of the threshold Eth. The threshold Eth varies with the dynamic range and the like of the video camera 1b, and a range in which nine 8-bit gradation values are added or subtracted is within a range from 0 to 1530, so that it is preferable that the threshold Eth is set within a range from 80 to 120. Points shown with black in FIG. 6 are pixels having a differential intensity exceeding the threshold Eth, which pixels will be called edge pixels hereinafter.

Figure 7:
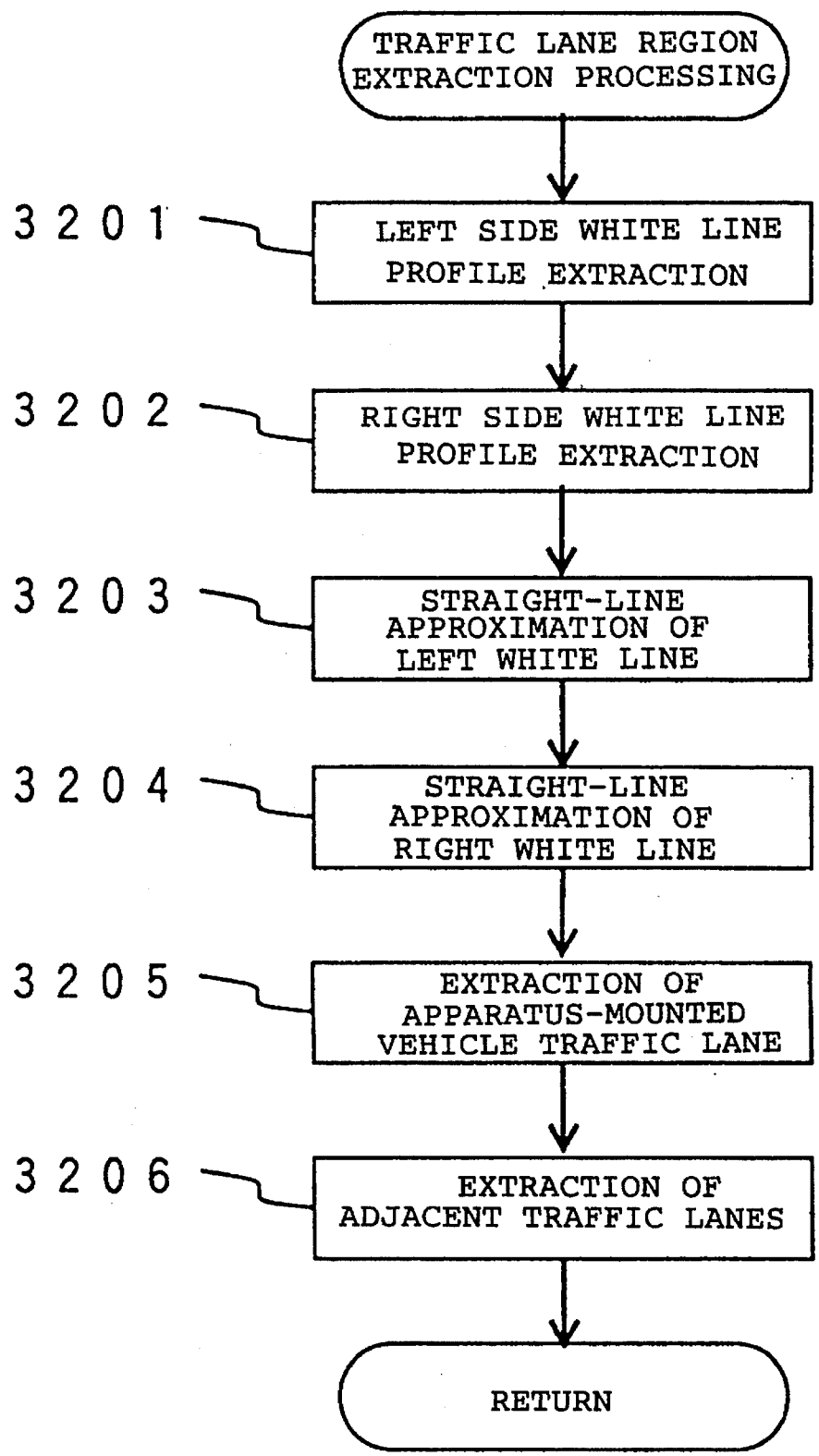
FIG. 7 is a flowchart showing an operation of the vehicle region extraction processing.

Then at step 3200 of FIG. 5, traffic lane regions are extracted from the road images. The flowchart of FIG. 7 shows a series of processing for the vehicle region extraction processing (step 3200 of FIG. 5). In this case, in order to improve a contour extraction accuracy of the white lines, the processing region is limited to the lower half portion of the images.

At step 3201 of FIG. 7, the contour of the left-hand white line painted on a road is extracted. First, as shown in FIG. 8, pixels are scanned from the center line of respective scanning lines in the left direction. Then, an initial position at which the differential intensity E (x, y) of each pixel determined at step 3100 of FIG. 5 exceeds the threshold Eth is taken as the contour point of the left-hand white line in the scanning line.

Then at step 3202 of FIG. 7, the contour of the right-hand white line is extracted. In a similar manner to the left-hand white line, the pixels of the contour of the right-hand white line are scanned from the center line of respective scanning lines of FIG. 8 in the right direction, and an initial position at which the differential intensity E (x, y) exceeds the threshold Eth is extracted as the contour point of the right-hand white line in the scanning line. FIG. 9 shows the results obtained by extracting the contour point row of the right/left-hand white lines. Pixels shown with black point are the contour points of the right/left-hand white lines.

Then at step 3203, the contour point row of the left-hand white line extracted at step 3201 is approximated in a straight line.

In a similar manner, at step 3204, the contour point row of the right-hand white line extracted at step 3202 is approximated in a straight line. The technique of the Hough transformation (U.S. Pat. No. 3,069,654 (1962)) is used for the straight-line approximation of point rows performed at steps 3203 and 3204.

Figure 10:
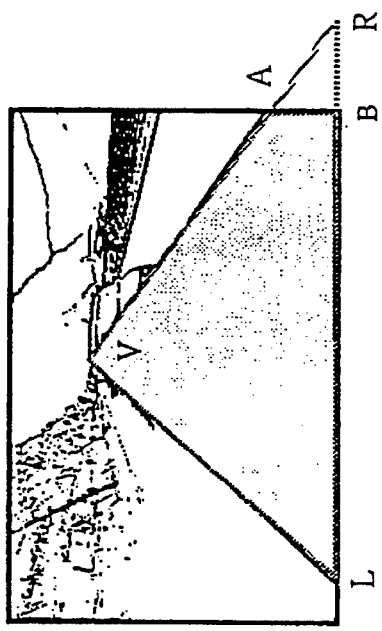
FIG. 10 is a view showing the results obtained by extracting traffic lane regions.

Further at step 3205, a region formed with the left-hand white line approximated line, the right-hand white line approximated line, the image lower end, the image left end and the image right end is extracted as a traffic lane region in which the apparatus-mounted vehicle cruises. FIG. 10 shows the results obtained by extracting the traffic lane region in which the apparatus-mounted vehicle cruises. The region surrounded by VLBA in FIG. 10 is the extracted traffic lane region.

Figure 11:
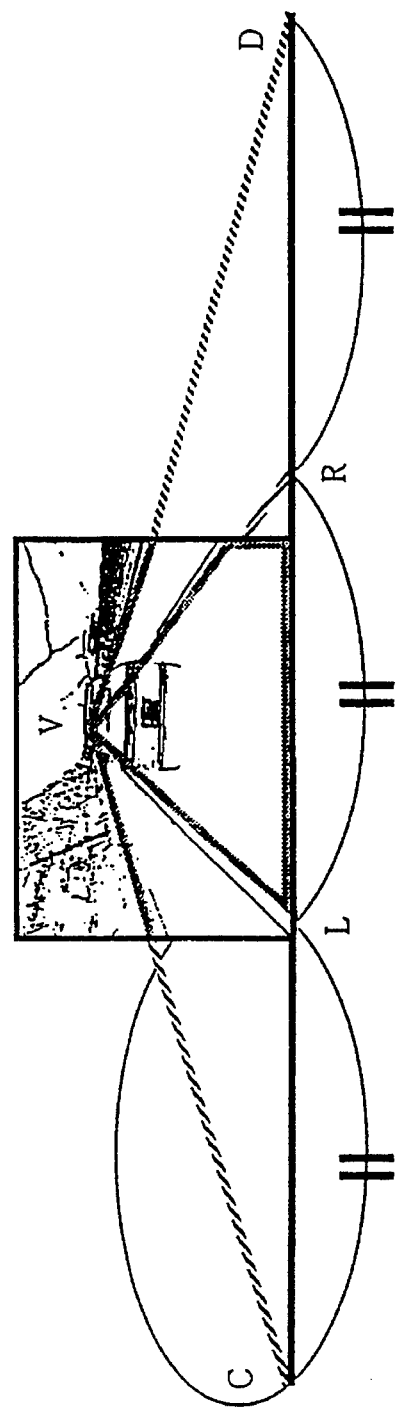
FIG. 11 is a view showing a method of extracting adjacent traffic lane regions.

Further at step 3206, right/left traffic lane regions adjacent to the apparatus-mounted vehicle traffic lane region extracted at step 3205 are approximately determined. In this case, as shown in FIG. 11, the triangle VCD obtained by extending double rightward/leftward the length of the base LR of the triangle VLR indicating the apparatus-mounted vehicle traffic lane region is extracted as the road image including the adjacent traffic lane regions.

Then at step 3300 of FIG. 5, the distribution of edges scattered in the traffic lane region extracted at step 3200 is checked to determine the preceding vehicle existing candidate region.

FIGS. 12a, 12b, 13a and 13b show typical views showing the concept of the edge searching processing. First, as shown in FIG. 12b, a processing region is limited to the apparatus-mounted vehicle traffic lane region extracted at step 3205 of FIG. 7. Then, in the processing region, the number of pixels having an edge intensity exceeding the threshold Eth (called edge pixels) is counted for each scanning line to prepare a histogram as shown in FIG. 12a. At the same time, an average coordinate position of these edge pixels in the scanning line direction is determined and taken as the gravity center Gx of the vehicle candidate region in the scanning line direction. The axis of the ordinate of the histogram represents respective scanning lines, while the axis of the abscissa represents the number of edges pixels. Then, a threshold Bth is set with respect to the number of edge pixels. The experiment performed using various images resulted in that the threshold Bth is preferably set to about 40. Among scanning lines in which the number of edges pixels exceeds the Bth, the scanning line positioned at the lowest position is extracted as the lower end of the vehicle candidate region. In FIG. 12a, the scanning line shown with B indicates the lower end of the vehicle candidate region. Where such scanning line satisfying the above-mentioned conditions is not extracted, the preceding vehicle is judged not to exist.

On the contrary, where the lower end of the vehicle candidate region is extracted, the right/left ends of the vehicle candidate region are extracted. FIGS. 13a and 13b show typical views showing the concept of the edge searching processing. First, as shown in FIG. 13a, a processing region is limited to the road region including adjacent traffic lanes extracted at step 3206 of FIG. 7 and to the region surrounded by the lower end of the preceding vehicle candidate region extracted by the preceding processing and the right/left ends of the image. The reason why such processing range is set is that the adjacent traffic lanes are observed at all times for a traffic lane change of the preceding vehicle or the interruption by another vehicle. Within the processing range, the number of edge pixels is counted for each vertical pixel column perpendicular to the scanning lines to prepare a histogram as shown in FIG. 13b. The axis of the abscissa of the histogram represents the lateral coordinates of the image, while the axis of the ordinate represents the number of edge pixels. In this case, as apparent from FIGS. 13a and 13b, it is understood that in the region outside the candidate region in which the preceding vehicle exists, compared to the inside of the vehicle candidate region, the frequency of the histogram rapidly decreases (P), and its dispersion becomes small (Q). Then, according to the following procedure, the right/left side ends of the vehicle candidate region are extracted. First, small windows having an interval width Sw are provided with respect to the axis of the abscissa of the histogram. Then, while calculating the mean value Emean and dispersion value Esigma of the edge frequency in the small windows, the windows are caused to be shifted from the gravity center position Gx of the vehicle candidate region to the outside rightward/leftward. Then, initial positions at which the Emean becomes the threshold Mth or less and the Esigma becomes the threshold Sth or less are extracted as the left end and the right end, respectively, of the vehicle candidate region. Preferably, the small window interval width Sw is set to about 20 pixels; the threshold Mth for the Emean, to about 15 pixels; and the threshold Sth for the Esigma, to about 17 pixels. FIG. 14 shows the results obtained by extracting the vehicle candidate region by the above-mentioned processing.

At step 3400 of FIG. 5, symmetrical regions are extracted. Generally, the preceding vehicle displayed on an image screen shows a substantially symmetrical shape with a segment perpendicular to scanning lines taken as a symmetrical axis. Thus, within the preceding vehicle candidate region defined at step 3300, the symmetrical region is extracted, thereby further limiting the preceding vehicle existing region.

According to the typical views shown in FIGS. 15 through 17b, the outline of these processings will be explained. First, as shown in FIG. 15, the processing range in which the symmetrical region is extracted is limited to the region within the preceding vehicle candidate region defined at step 3300. Then, within the processing region, a symmetrical axis perpendicular to scanning lines is determined. For example, as shown in FIG. 16a, assuming that a symmetrical point with respect to the point A on the same scanning line is the point B, their symmetrical axis S2 passes through the mid point between the points A and B. Although no view is shown, on the same scanning line for the points A and B, there can be another pair of symmetrical points (thus, there can be another symmetrical axis). In a similar manner, assuming that a symmetrical point with respect to the point G is the point H, their symmetrical axis S1 passes through the mid point between the points G and H. The position of such symmetrical axis is calculated for each pair of edge points distributed in the processing region to prepare a histogram as shown in FIG. 16b. Then, the position indicating the peak of the histogram is extracted as a symmetrical axis. The symmetrical region is extracted by searching edge points becoming a pair with respect to the symmetrical axis.

Figure 18A:
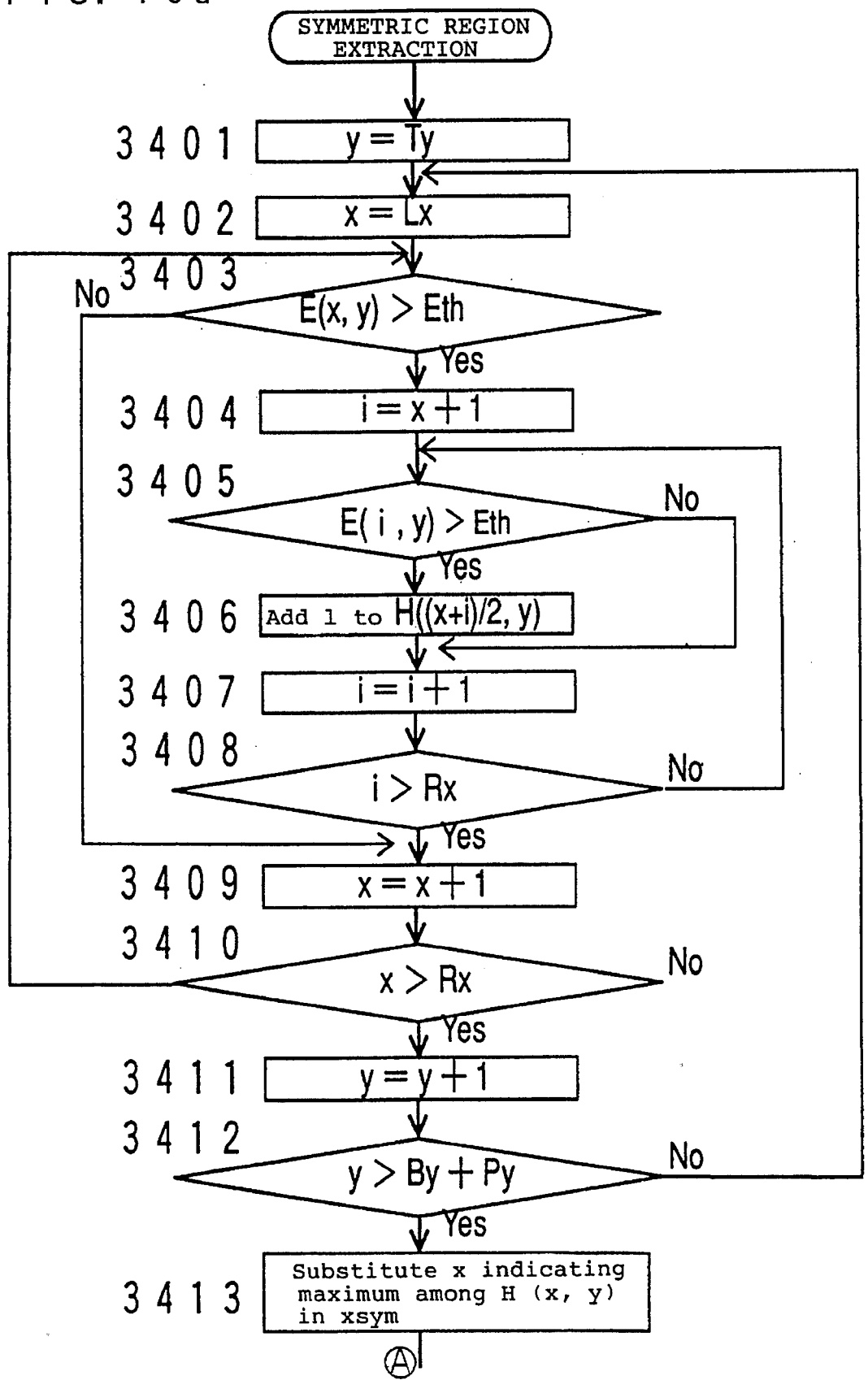
FIGS. 18a and 18b are flowcharts showing an operation of the symmetric region extraction processing.
Figure 18B:
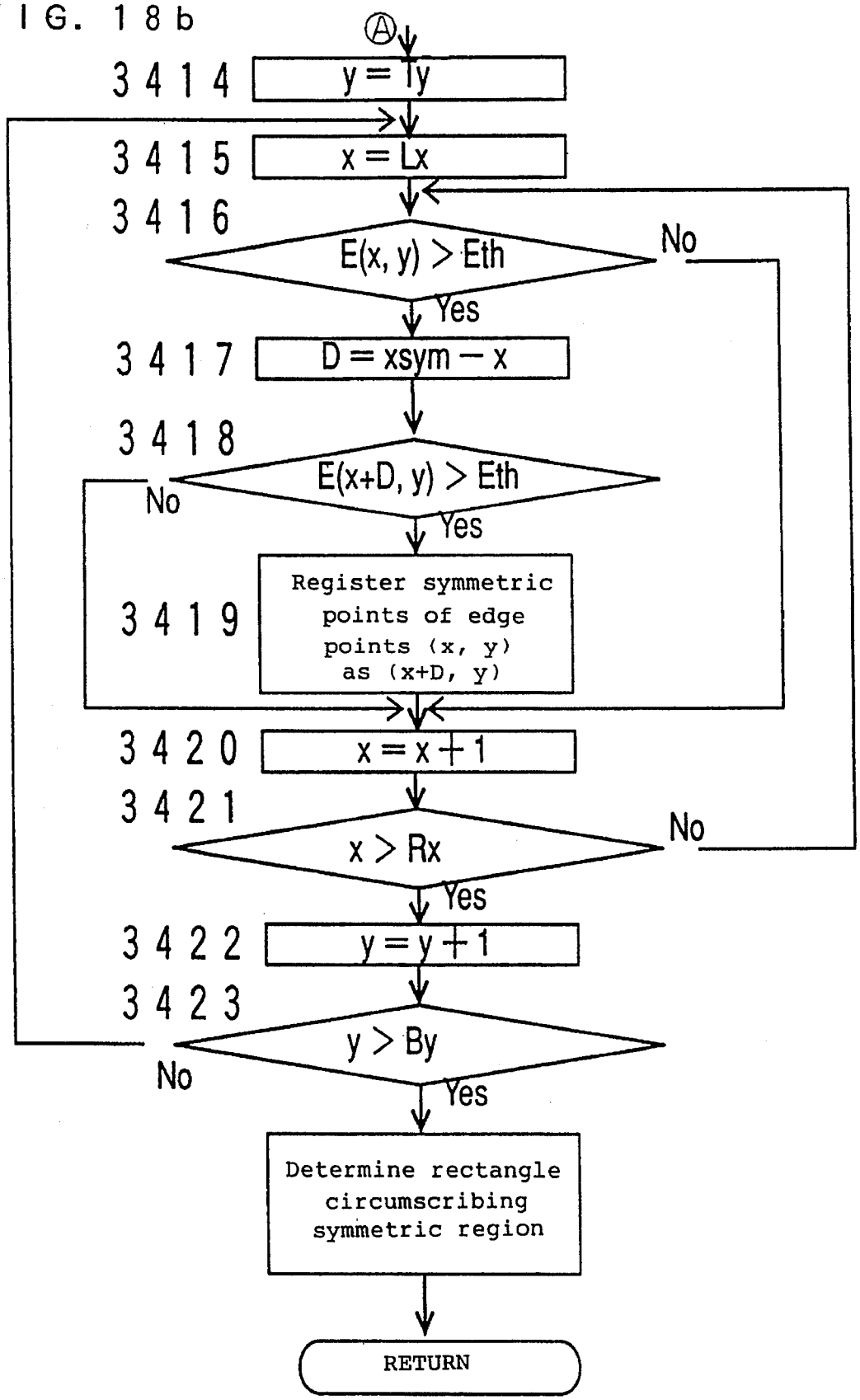

FIGS. 18a and 18b show a series of flow of the processing. First, through the processing performed at steps 3401 through 3413, the symmetrical axis is extracted. At steps 3401 and 3402, an initial value of the processing range is set. The processing range in this case is the vehicle candidate region defined at the step 3300 of FIG. 5, wherein the y coordinate of the upper limit is expressed in Ty; that of the lower limit, in By: the x coordinate of the left limit, in Lx; and that of the right limit, in Rx. As shown at step 3403, where the differential intensity E (x, y) at the coordinate (x, y) in the image exceeds the threshold Eth, as shown at steps 3404 through 3408, a mid point between the coordinate point and each pixel which is present on the same scanning line and has a differential intensity exceeding the threshold Eth is determined, and added to a histogram corresponding to the mid point position at step 3406. As shown at steps 3409, 3410, 3411 and 3412, the processing is repeated for each edge point within the processing region. Then at step 3413, the peak of histograms thus obtained is determined and stored with the x coordinate at that time taken as a symmetrical axis xsym of the vehicle region. Further, in the processing at steps 3414 through 3423 (FIG. 18b), the symmetrical region with respect to the symmetrical axis xsym thus determined is extracted. The processing is such that where after the processing region is initialized at steps 3414 and 3415, a pixel (x, y) whose differential intensity exceeds the threshold Eth is confirmed at step 3416, a distance D between the pixel and the symmetrical axis is determined at step 3417. Then at step 3418, it is determined whether a pixel whose differential intensity exceeds the threshold Eth is present with respect to symmetrical axis xsym. Where the pixel is present, a pair of the determined symmetrical points are registered at step 3419. Further, the processing is performed for each edge point within the processing region as shown at steps 3420 through 3423. Finally, a rectangle circumscribing the symmetrical region is determined at step 3424, and then its width W and height H are determined. FIG. 17a shows the results obtained by extracting the symmetrical region; and FIG. 17b shows a rectangular region circumscribing the symmetrical region of FIG. 17a.

Then at step 3500 of FIG. 5, with respect to the symmetrical region extracted at step 3400, an initial model of Active Contour Models is set.

Figure 19:
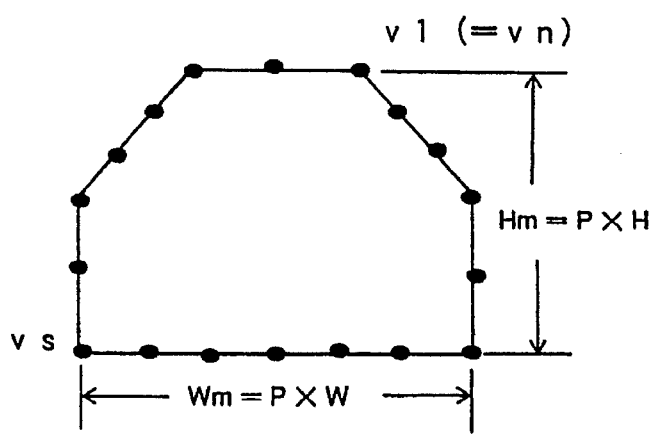
FIG. 19 is a view showing an initial model of Active Contour Models.
Figure 20:
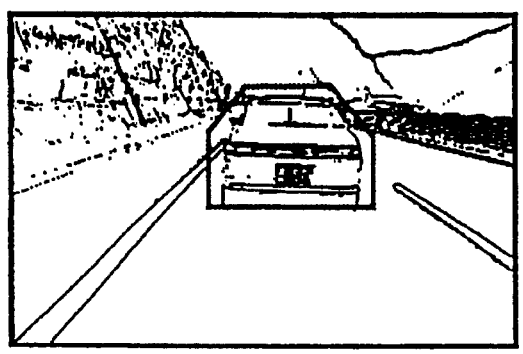
FIG. 20 is a view showing a setting state of the Active Contour Models.

The initial model has a shape approximating a vehicle shape as shown in FIG. 19, and comprises a number n of nodes arranged at equal intervals. The figure n of the nodes in this case is preferably about 44. The width Wm and height Hm of the initial model are set by multiplying the W and H determined at step 3424 (FIG. 18b) by a parameter P. The parameter P is preferably set within the range 1.05 to 1.07. Further, the initial model is installed in such a manner that the gravity center Cm of the initial model is matched to the gravity center C of the symmetric region determined at step 3400, whereby the initial value of the Active Contour Models can be set to a proper position with respect to the vehicle region.

At step 3600 of FIG. 5, the contour of the preceding vehicle is extracted by the use of the Active Contour Models technique. The dynamic contour model is a technique by which an energy function Esnakes is defined from the characteristic of an image and the shape of a model, and in the process of minimizing the energy function, the contour of an object is extracted. The energy function Esnakes is composed of an internal energy Eint as a force relating to the shape of a model, such as smoothness and internode distance, an image energy Eimage as a force by which the model is drawn to the image characteristic, and an external energy Econ as a force to restrain externally the change in the shape of the model. Esnakes is expressed as in the equation (1), wherein vi (i=1, 2, 3, - - -, n) is a node of the contour model.

$$Esnakes\ (vi) = Eint\ (vi) + Eimage\ (vi) + Econ\ (vi) \quad (1)$$

Further, the internal energy Eint can be calculated by the equation (2). α and β are weight parameters for each term.

$$Eint\ (vi) = \alpha |vi-vi-1|^2 + \beta |vi-1-2vi+vi+1|^2 \quad (2)$$

The image energy Eimage as a potential field from edges in an image is calculated as a density gradient on the image as shown in the equation (3), wherein γ is a weight parameter for the image energy.

$$Eimage\ (vi) = -\gamma |\nabla I\ (x, y)| \quad (3)$$

As the external energy, considering the symmetricalness of the preceding vehicle, there is given a restraining force in shape change so that the contour model is contracted symmetrically, as shown in the equation (4), wherein g is a gravity center coordinate of the contour model; vi* is a symmetrical point of the vi with respect to the symmetrical axis passing through the gravity center C; and δ is a weight parameter for the external energy.

$$Econ\ (vi) = \delta\ | |vi-g|-|vi*-g|\ | \quad (4)$$

Figure 21:
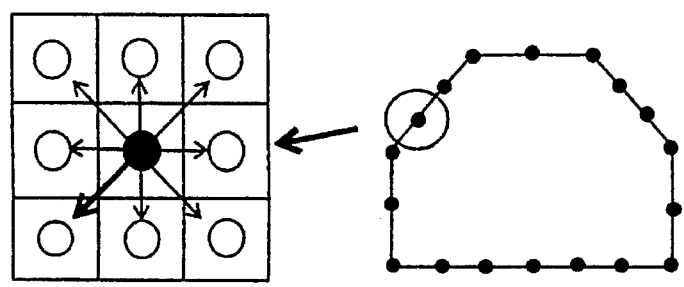
FIG. 21 is a view showing a method of minimizing an energy of the Active Contour Models.
Figure 22A:
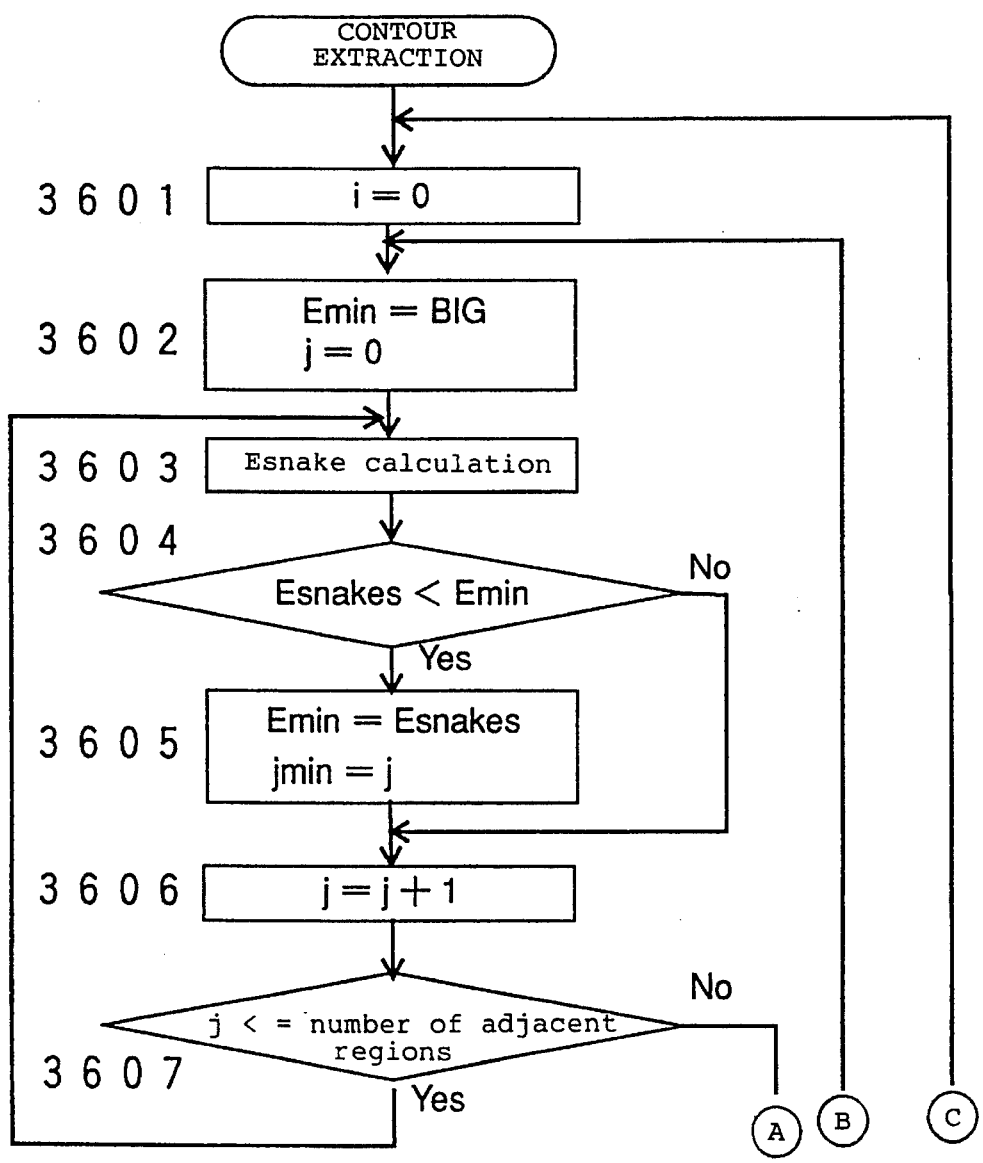
FIGS. 22a and 22b are flowcharts showing an operation of the contour extraction processing by the Active Contour Models technique.
Figure 22B:
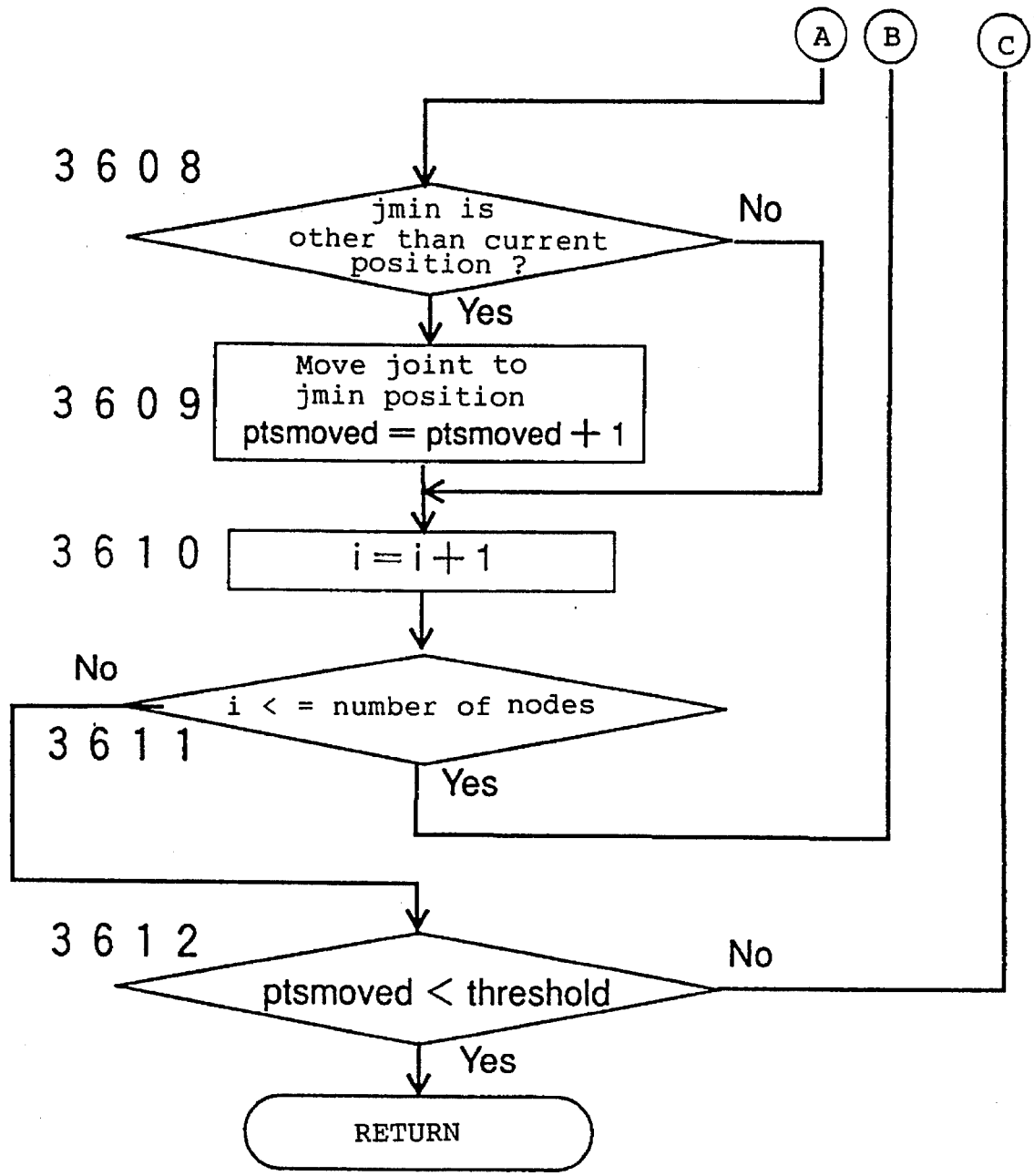
Figure 23:
FIG. 23 is a view showing the results obtained by extracting vehicle contours by the contour extraction processing.

The energy function Esnakes thus defined is evaluated in the region near each joint of the contour model, and the joint is caused to be shifted to a position at which energy becomes the smallest, thereby causing the model to be contracted. Where the number of nodes to be shifted becomes a certain threshold or less, the contour model is judged to be converged to finish the model contraction. FIGS. 22a and 22b show a series of flow of the processing. At steps 3601 and 3602, the parameters are initialized. Then at step 3603, the Esnakes is calculated according to the equations (1) through (4). Then at step 3604, the Esnakes calculated at the step 3603 is compared with the energy of the adjacent pixels. Where the Esnakes is judged to be smaller, at step 3605, the Esnakes is held as the minimum value of the energy, and at step 3606, a parameter is added to calculate the energy of the next adjacent pixels, and then the process returns to step 3603. On the contrary, where the Esnakes is judged to be larger, the process returns to step 3603 without updating the minimum value of the energy. On the basis of the judgment at step 3607, the processing is repeated for each adjacent region previously set. Then at step 3608, where the minimum value of the final energy is judged to be obtained at current positions of nodes, the process as it is proceeds to step 3610. On the contrary, where the minimum value of the energy is judged to be obtained in the adjacent pixels at positions other than the current ones of the nodes, at step 3609, the nodes are shifted to the positions of adjacent pixels, and the process proceeds to step 3610. FIG. 21 shows a concept of the processing at these steps. Then at step 3610, a parameter is added, and then on the basis of the judgment at step 3611, the processing from 3602 to 3611 is repeated for each node. At step 3611, when the processing for each node is judged to be finished, the number of shifted nodes at step 3612 is evaluated, and where the figure is the threshold value or less, the contour model is judged to be converged, thereby finishing the processing. On the contrary, where the number of shifted nodes is the threshold value or more, the process returns to step 3601, at which the processing for each node is repeated again. The above-mentioned processing allows the contour of the preceding vehicle to be extracted from the road image.

Then at step 4000 of FIG. 3, a distance to the preceding vehicle recognized at step 3000 is measured. According to the principle of triangulation, the intervehicle distance is calculated by extracting the disparity between the preceding vehicles on a pair of stereo images picked up from the video cameras 1a and 1b.

Figure 24:
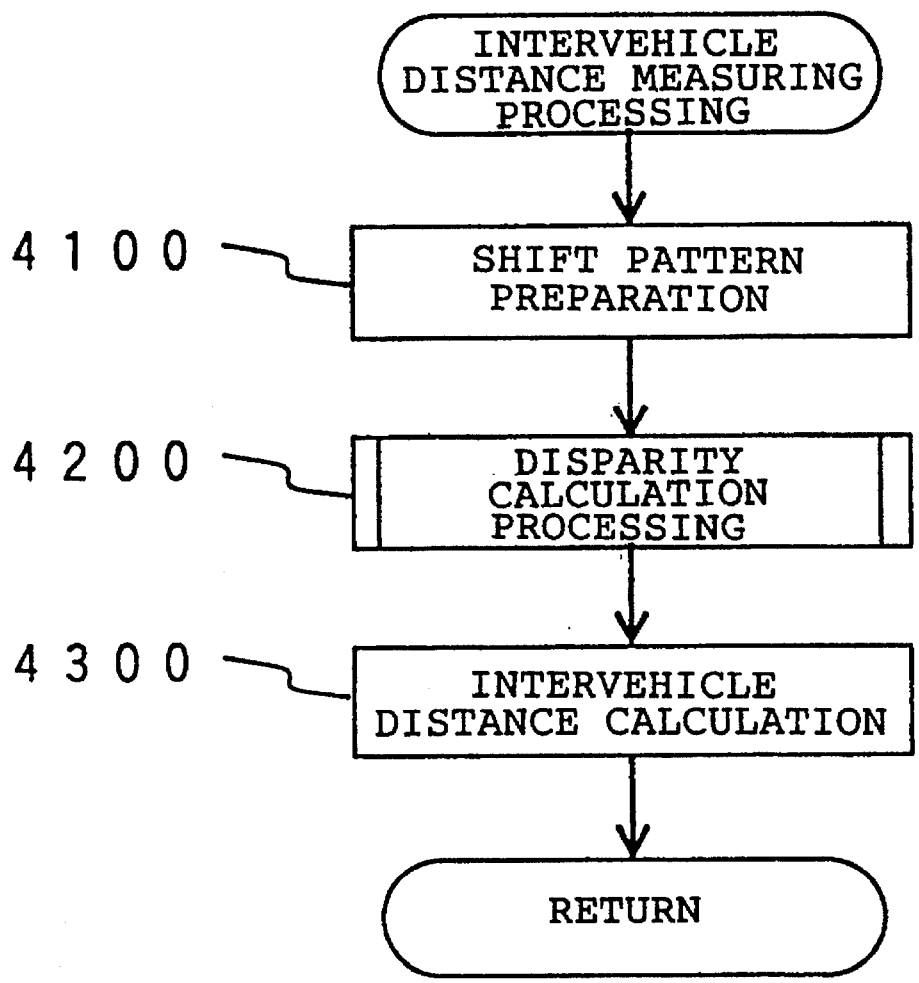
FIG. 24 is a flowchart showing an operation of the intervehicle distance measuring processing.

The flowchart of FIG. 24 shows a series of the flow of the intervehicle distance measuring processing. First at step 4100, on the basis of the contour information of the preceding vehicle extracted at step 3000 of FIG. 3, a pattern to extract the disparity between stereo images is prepared.

Figure 25A:
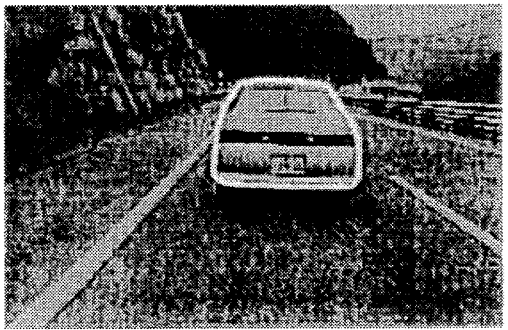
FIGS. 25a and 25b are views showing the results obtained by extracting vehicle contours from FIGS. 4a and 4b.
Figure 25B:
Figure 26A:
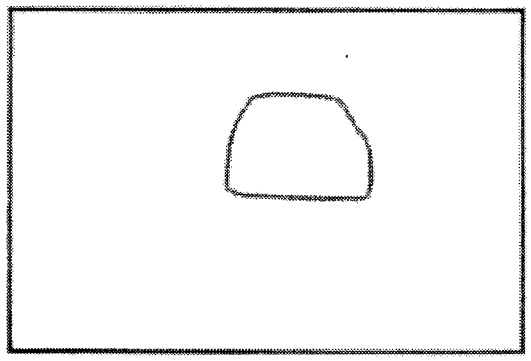
FIGS. 26a and 26b are views showing contour models of the contour extraction results shown in FIGS. 25a and 25b.
Figure 26B:
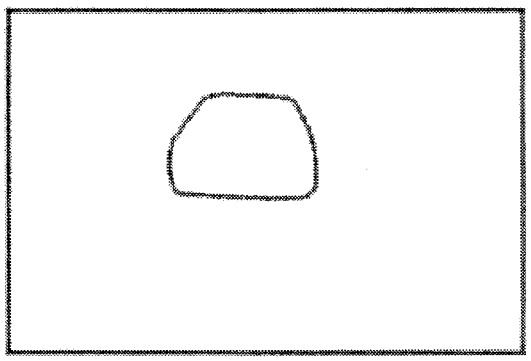
Figure 27:
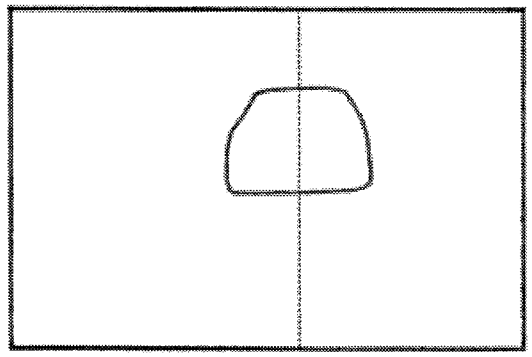
FIG. 27 is a view showing a shift pattern for disparity extraction.

FIGS. 25a and 25b show the results obtained by extracting the contour of the preceding vehicle from the stereo images of FIGS. 4a and 4b, respectively; and FIGS. 26a and 26b represent only the contour models among the extracted contours. FIG. 27 is a view obtained by reversing the contour model of FIG. 26a with respect to the symmetric axis of the preceding vehicle extracted at step 3400 of FIG. 5. The reason why the model is caused to be reversed with respect to the symmetric axis is that a distortion between the right/left images due to stereo vision is to be corrected.

Figure 28:
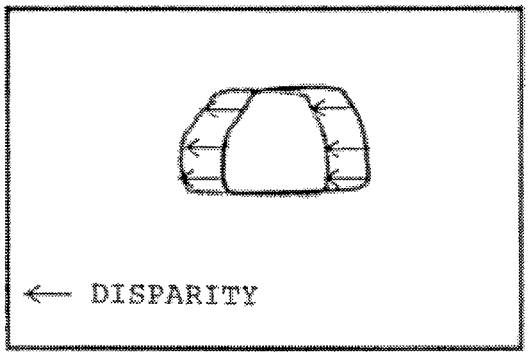
FIG. 28 is a view showing a shift operation for disparity extraction

Then at step 4200 of FIG. 24, with the reversed contour model taken as a shift pattern and the contour model of FIG. 26b taken as a reference pattern, while establishing a correlation between both the patterns, a shift operation is performed in the scanning direction. FIG. 28 shows a conceptional view of the shift operation. As a correlation, the degree of overlapping of contour lines in both the patterns is used. The shift by which the correlation becomes the maximum is extracted as a disparity d between both images.

Then at step 4300 of FIG. 24, by the use of the disparity extracted at step 4200, the intervehicle distance is calculated according to the equation (6).

$$\text{Distance } D = \frac{\text{Intercamera optical axes distance } DB \times \text{focal length } f}{\text{disparity (pixel) } d \times \text{pixel size } PS} \quad (6)$$

It is preferable that the distance DB between the optical axes of the video cameras 1a and 1b is about 1 m, and that the focal length f is about 7.5 mm. The pixel size PS to be used, which varies with image pick-up devices used, has preferably has a resolution as high as possible.

Figure 29:
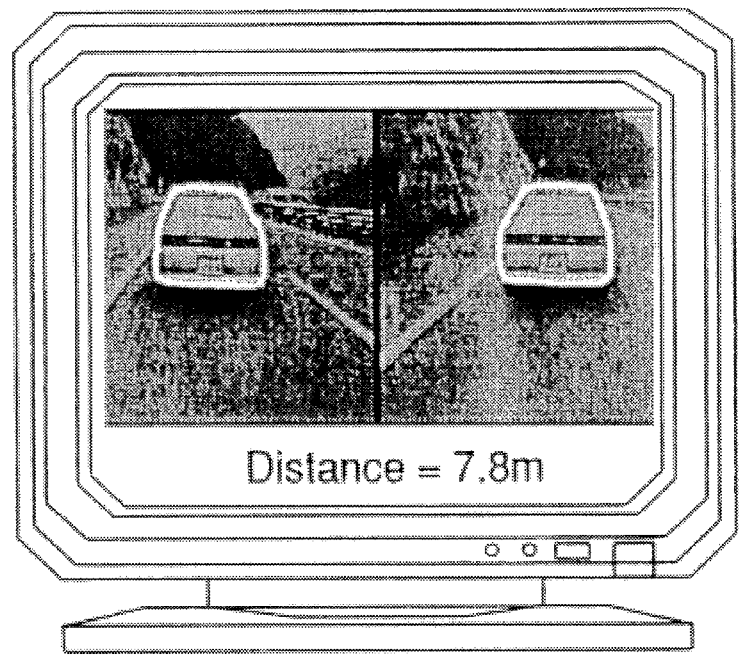
FIG. 29 is a view showing a display installed in the vehicle.

At step 5000 of FIG. 3, the distance to the preceding vehicle calculated by the above-mentioned processing is output. The output of the results is performed by a display installed in the vehicle compartment. FIG. 29 shows an example of the output to the display. An output terminal such as RS232C is provided to implement various application functions using intervehicle information calculated by this apparatus, such as an autocruise for cruising the vehicle with the distance to the preceding vehicle kept constant, or an intervehicle distance alarm device for warning the driver if the distance to the preceding vehicle becomes a certain value or less.

Although in the embodiment of the present invention, the Sobel filter has been used in performing edge extraction from images, any filter capable of extracting edges from images, such as Laplacian, may be used. Although in the traffic lane region extraction processing, the Hough transformation has been used in straight-line approximating the contour point row of white lines, any straight-line approximating technique, such as the method of least squares, may be used. Although in the embodiment of the present invention, the model representing the shape of an ordinary automobile has been used as the initial model of the dynamic contour model, a model assuming the shape of other vehicle types, such as large trucks, may be used.

What is claimed is:

1. A vehicle recognition apparatus which recognizes a preceding vehicle from road images input by use of vehicle-mounted video cameras and measures a distance to the recognized vehicle, comprising:

stereo image input means mounted on a vehicle for picking up stereo road scenes in front of the vehicle;

image storage means for storing the road scenes information input from said stereo image input means;

edge extraction means for applying a differential processing to the road scenes information stored in said image storage means, to thereby extract edges;

traffic lane region extraction means for extracting a traffic lane region from the road scenes information stored in said image storage means;

vehicle edge searching means for producing a histogram by projecting edges which are extracted by said edge extraction means and are included within the traffic lane region extracted by said traffic lane region extraction means, to thereby produce axes of the image, said vehicle edge searching means further provided for extracting a position at which the histogram converges as an edge of a preceding vehicle existing region candidate;

symmetric region extraction means for extracting a symmetric region within the preceding vehicle existing region candidate defined by said vehicle edge searching means and for further limiting the preceding vehicle existing region candidate;

initial model setting means for setting an initial contour model for the preceding vehicle from a ratio of a width and height of the preceding vehicle existing region candidate defined by said symmetric region extraction means, said initial model setting means further provided for selecting an initial model having a most adequate configuration among prepared models having various configurations, said initial model setting means further expanding or compressing the selected initial model based on a size of the preceding vehicle existing region candidate, such that a center of the expanded or compressed initial model coincides with a center of the preceding vehicle existing region candidate;

contour extraction means for defining various features of the preceding vehicle as an energy function, the features being present in the road scenes information stored in said image storage means, said contour extraction means further provided for dynamically transforming the initial model obtained from said initial model setting means by evaluating the energy function, to obtain a closer contour of the preceding vehicle; and intervehicle distance measuring means for measuring a distance to the preceding vehicle on the basis of the contour of the preceding vehicle extracted by said contour extraction means.

2. A vehicle recognition apparatus as set forth in claim 1, wherein:

said traffic lane region extraction means extracts a traffic lane region corresponding to a traffic lane in which the vehicle including the vehicle recognition, apparatus cruises, based on the road scenes information stored in said image storage means, and said traffic lane extraction means further extracts an adjacent right traffic lane region and an adjacent left traffic lane region at a lower end of the road scenes of the extracted traffic lane region.

3. A vehicle recognition apparatus as set forth in claim 2, wherein:

said vehicle edge searching means projects edges which are included within the traffic lane region corresponding to the traffic lane in which the vehicle cruises to an ordinate axis of the image, wherein said vehicle edge searching means extracts a scanning line as a lower edge of the preceding vehicle existing region candidate, the extracted scanning line being a lowest scanning line among scanning lines whose histograms are over a threshold value, and wherein said vehicle edge searching means projects edges which are included within the traffic lane region corresponding to the traffic lane in which the vehicle cruises and the adjacent right and left traffic lane regions to an abscissa axis of the image, wherein said vehicle edge searching means extracts positions as right side edges and left side edges of the preceding vehicle existing region candidate, the positions being positions at which a variance value of the histogram is over a threshold value.

4. A vehicle recognition apparatus as set forth in claim 1, wherein:

the symmetric region extraction means adds up midpoint positions between edges which are present on a scanning line, to thereby extract symmetric axes of a whole region.

5. A vehicle recognition apparatus as set forth in claim 1, wherein:

the intervehicle distance measuring means performs a shift operation in such a manner that among vehicle contours extracted from the stereo road scenes, a contour of one road scene is reversed with respect to its symmetric axis and is made a shift pattern, and a contour of the other road scene is made a reference pattern, and said intervehicle distance measuring means further includes means for extracting a shift amount by which a correlation value of both the shift pattern and the reference pattern becomes a minimum, as a disparity between the stereo road scenes, thereby calculating the distance to the preceding vehicle.

* * * * *

UNITED STATES PATENT AND TRADEMARK OFFICE
CERTIFICATE OF CORRECTION

PATENT NO. : 5,487,116

DATED : January 23, 1996

INVENTOR(S) : Nakano et al.

It is certified that error appears in the above-indentified patent and that said Letters Patent is hereby corrected as shown below:

On the cover page, item [56] References Cited, add the following: --

FOREIGN PATENT DOCUMENTS
1281600   11/1989   Japan
2265779   10/1993   Great Britain OTHER DOCUMENTS
Ozaki et al., "An Image Processing System for Autonomous Vehicle", MOBILE ROBOTS IV, Proceedings of the SPIE, vol. 1195, pgs. 256-266, 1989.
Koller et al., "Using Binocular Stereopsis for Vision-based Vehicle Control", Proceedings of the Intelligent Vehicles '94 Sym., pgs. 237-242, 10-24-94.
Suzuki et al., "Lane Recognition System for Guiding of Autonomous Vehicle", Proceedings of the Intelligent Vehicles '92 Symp., pgs. 196-201, 6-29-92.
Search Report dated June 2, 1995.

Column 11, line 1, delete the comma "," after "recognition".

Signed and Sealed this

Ninth Day of July, 1996

*Attest:*

BRUCE LEHMAN

*Attesting Officer*     *Commissioner of Patents and Trademarks*